United States Patent
Ma et al.

(10) Patent No.: US 9,170,823 B2
(45) Date of Patent: Oct. 27, 2015

(54) FAST-BOOT LIST TO SPEED BOOTING AN OPERATING SYSTEM

(71) Applicant: LSI Corporation, San Jose, CA (US)

(72) Inventors: Li Zhao Ma, Shanghai (CN); Rong Yuan, Shanghai (CN); Zhi Min Dong, Shanghai (CN); Lei Zhang, Shanghai (CN); Jian Gang Wu, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 300 days.

(21) Appl. No.: 13/777,025

(22) Filed: Feb. 26, 2013

(65) Prior Publication Data

US 2014/0215199 A1    Jul. 31, 2014

(30) Foreign Application Priority Data

Jan. 29, 2013   (CN) .......................... 2013 1 0033786

(51) Int. Cl.
    *G06F 9/44*         (2006.01)
(52) U.S. Cl.
    CPC ................... *G06F 9/4406* (2013.01)
(58) Field of Classification Search
    CPC .................................................. G06F 9/4401
    USPC ............................................................. 713/2
    See application file for complete search history.

(56) References Cited

U.S. PATENT DOCUMENTS

| | | | | |
|---|---|---|---|---|
| 7,181,608 | B2 * | 2/2007 | Fallon et al. | 713/2 |
| 7,886,140 | B2 * | 2/2011 | Jiang | 713/2 |
| 8,266,418 | B2 | 9/2012 | Yun | 713/1 |
| 8,296,555 | B2 | 10/2012 | Chu et al. | 713/1 |
| 8,327,066 | B2 | 12/2012 | Heo et al. | 711/103 |
| 8,352,706 | B2 | 1/2013 | Yano et al. | 711/206 |
| 8,423,754 | B2 * | 4/2013 | Lee | 713/2 |
| 8,429,677 | B2 * | 4/2013 | Shu et al. | 719/321 |
| 8,874,887 | B2 * | 10/2014 | Mruthyunjaya et al. | 713/2 |
| 8,880,862 | B2 * | 11/2014 | Fallon et al. | 713/2 |
| 2001/0039612 | A1 * | 11/2001 | Lee | 713/2 |

* cited by examiner

*Primary Examiner* — Suresh Suryawanshi
(74) *Attorney, Agent, or Firm* — Suiter Swantz pc llo

(57) ABSTRACT

A method for booting to an operating system stored on a solid state drive. The method comprises the steps of (A) determining if a boot list has one or more entries, (B) pre-reading one or more logical block addresses of each of the entries from the boot list, (C) receiving a command from a host, (D) reading the command from a memory internal to the solid state drive if the command is in a cache area of the pre-read logical block addresses and (E) reading the command from a main portion of the solid state drive if the command is not in the cache.

20 Claims, 6 Drawing Sheets

FAST-BOOT LIST TO SPEED BOOTING AN OPERATING SYSTEM

FIELD OF THE INVENTION

The present invention relates to memory storage devices generally and, more particularly, to a method and/or apparatus for implementing a fast-boot list to speed up the booting of an operating system.

BACKGROUND

When a conventional computer boots from a drive, a host will first read operating system (OS) files from the drive. Once the OS files have been initially installed to a drive, (such as windows, Linux, etc.), the OS files are seldom modified and remain in some fixed logical block address (LBA) area. Reading the OS files from a boot drive to a host takes time, even when using a solid state drive (SSD). Traditionally, when a boot drive is booted, the boot drive will wait for the host to send read commands. Once the boot drive receives read commands from the host, the boot drive will read data, and then send the data to host. Such a boot sequence is derived from legacy hard disks, so the access address is still to a logic block address (LBA). A boot procedure for an OS can be treated as reading a number of LBAs.

SUMMARY

The present invention concerns a method for booting to an operating system stored on a solid state drive. The method comprises the steps of (A) determining if a boot list has one or more entries, (B) pre-reading one or more logical block addresses of each of the entries from the boot list, (C) receiving a command from a host, (D) reading the command from a memory internal to the solid state drive if the command is in a cache area of the pre-read logical block addresses and (E) reading the command from a main portion of the solid state drive if the command is not in the cache.

BRIEF DESCRIPTION OF THE FIGURES

Embodiments of the invention will be apparent from the following detailed description and the appended claims and drawings in which:

DETAILED DESCRIPTION OF THE PREFERRED EMBODIMENTS

Embodiments of the invention may include providing a system or method for implementing a boot sequence that may (i) be used in a solid state drive (SSD), (ii) reduce the time needed to boot an operating system (OS) from a SSD, and/or (iii) distinguish between an access to an SSD that is a boot sequence or an access that is a normal read operation to the SSD.

An embodiment of the invention may speed up booting an operating system (OS), especially when implemented on a solid state drive (SSD). A fast-boot list may be created that records a number of logical block addresses (LBAs) that a host will read during a boot sequence of a computer (or device). The list will be saved to NAND flash memory (or other non-volatile memory) in the drive. When booting a computer (or device), the SSD will first preread the LBAs in the boot list to read OS data from the boot drive. During normal operation, almost all of the host reads will be cache-hits, so control of the boot drive may return the data to host almost immediately.

Figure 1:
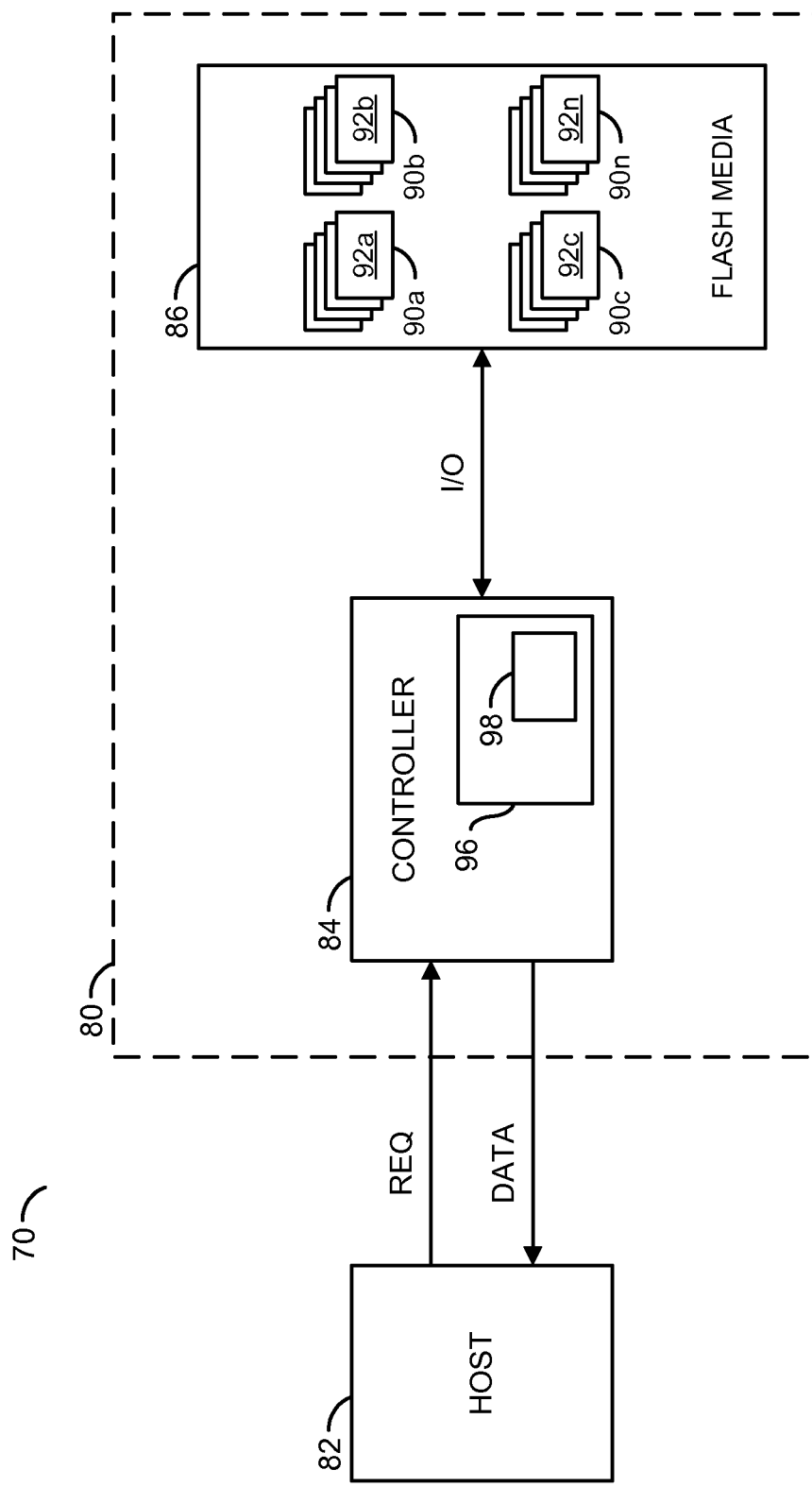
FIG. 1 is a block diagram of a context of the invention.

Referring to FIG. 1, a block diagram of a system 70 illustrating an embodiment Of the invention is shown. The system 70 generally comprises an apparatus 80 and a block (or circuit) 82. In one example, the system block 82 may be implemented as a device (or host), such as a mobile computing device, having a nonvolatile memory circuit. However, other types of devices may be implemented to meet the design criteria of a particular implementation. The device 80 generally comprises a solid state drive (SSD). The device 80 generally comprises a block (or circuit) 84, and a block (or circuit) 86. The circuit 84 may include a block (or circuit) 96. The block 84 is shown as a controller. The block 96 is shown as a memory. The memory 96 may store firmware 98, or other software, used to control the circuit 84 and/or the circuit 86. The firmware 98 may operate the controller 84 and include the fast-boot operations described.

In one embodiment, the memory 96 may include a cache area to hold the boot list. In another embodiment, a separate cache memory may be implemented on the controller circuit 84 to hold the boot list. The particular location of the cache memory may be varied to meet the design criteria of a particular implementation. In general, the cache area may be implemented as a static random access memory (SRAM). However, the particular type of memory used to implement the cache area may be varied to meet the design criteria of a particular implementation.

A signal (e.g., REQ) may be generated by the circuit 82. The signal REQ may be received by the circuit 84. The signal REQ may be a request signal that may be used to access data from the circuit 86. A signal (e.g., I/O) may be generated by the circuit 84 to be presented to the circuit 86. The signal REQ may include one or more address bits. A signal (e.g., DATA) may be one or more data portions received by the circuit 82.

The circuit 82 is shown implemented as a host circuit. The circuit 82 reads and writes data to and from the circuit 86. The circuit 86 is generally implemented as a nonvolatile memory circuit such as a NAND flash. However, other types of memory (e.g., or flash, etc.) may be implemented to meet the design criteria of a particular implementation. The circuit 86 may include a number of modules 90a-90n. The modules 90a-90n may be implemented as NAND flash chips. In some embodiments, the circuit 86 may be a NAND flash device. In other embodiments, the circuit 84 and/or the circuit 86 may be implemented as all or a portion of a solid state drive having one or more nonvolatile devices. The circuit 86 is generally operational to store data in a nonvolatile condition. When data is read from the circuit 86, the circuit 82 may access a set of data (e.g., multiple bits) identified in the signal REQ. In one example, modules 90a-90n may be prefabricated modules hardwired to a printed circuit board (PCB). In another example, the modules 90a-90n may be removable modules that may be used to increase or decrease the total size of the circuit 86. In one embodiment, the circuit 86 may include both removable and/or non-removable modules 90a-90n. Additionally, each of the modules 90a-90n may include a number of individual memory elements 92a-92n.

Figure 2:
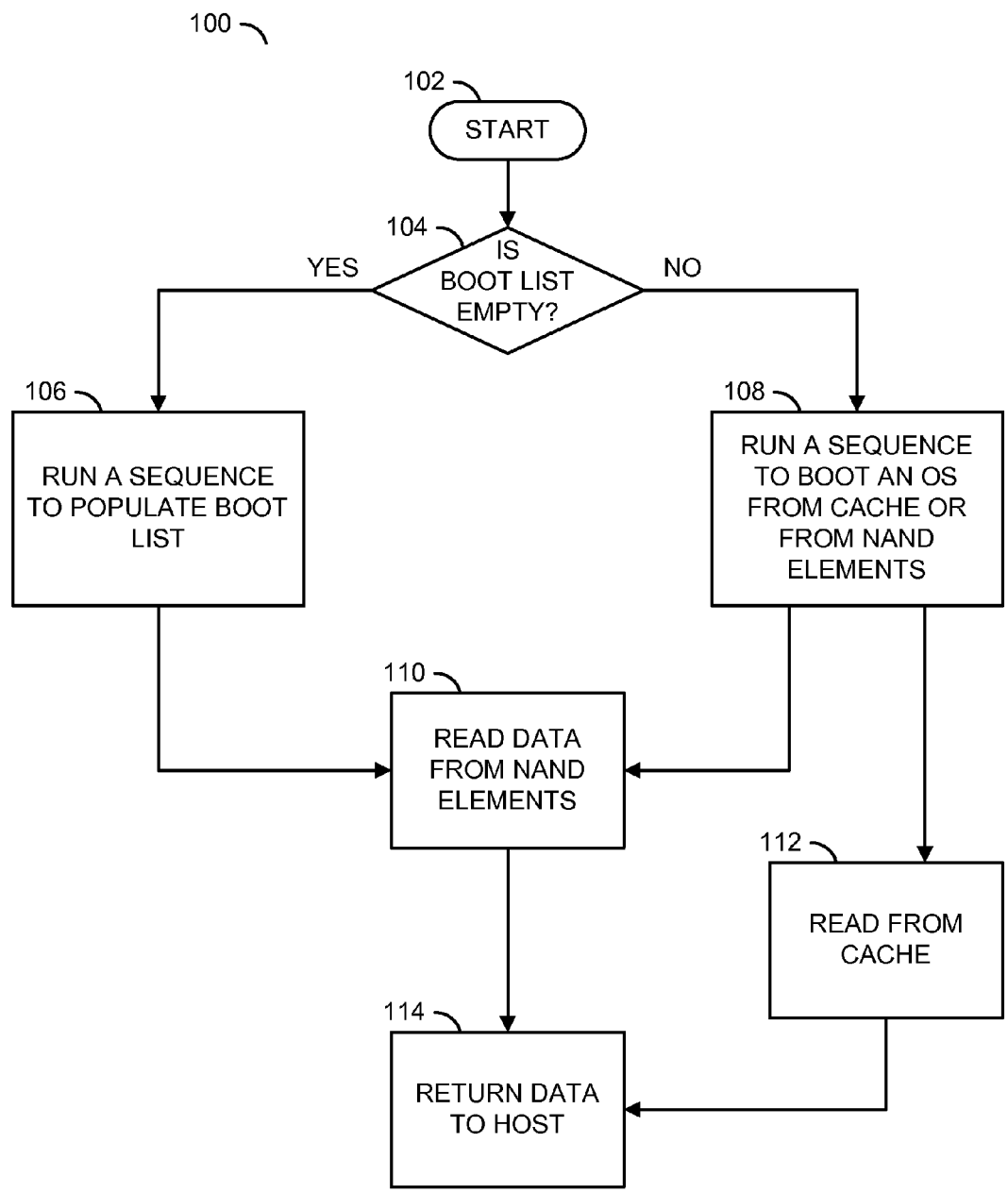
FIG. 2 is a flow diagram of an embodiment of the invention.

Referring to FIG. 2, a diagram of a process 100 is shown. The process 100 generally comprises a step (or state) 102, a decision step 104, a step (or state) 106, a step (or state) 108, a step (or state) 110, a step (or state) 112, a step (or state) 114. The step 102 may be a start state. The step 104 may determine if a boot list is empty. If so, the method 100 moves to the state 106. The state 106 runs a sequence to populate the boot list. If the state 104 determines the boot list is not empty, the method 100 moves to the state 108. The state 108 determines whether a sequence to boot an operating system should be from a cache area or from the NAND elements of the SSD. If the method 100 boots from the NAND elements, the method 100 moves to the state 110. If the method 100 boots from the cache area, the method moves to the state 112, when the OS is booted from the cache. The state 110 and/or the state 112 both move to the state 114, where data is returned to the host 82.

The method 100 treats the first N seconds after a power up as an OS "loading" time. During the loading time, the host 82 will read the OS files. All of the LBAs that are read in the loading time may be recorded to the fast-boot list, which is normally written to NAND. During a subsequent power up operation, SSD firmware 98 will pre-read all the LBAS in this fast-boot list. When the host 82 reads the OS files, and all of the reads from the host 82 are cache hits, data from the internal RAM of the SSD is sent to the host 82, which saves time.

The method 100 distinguishes between the LEAs of boot files and the LBAs of the OS. The method 100 adopts a generally log-based approach. For example, a specified recording time (e.g., N seconds) may be set. In one example, the recording time may be set to 10 seconds. However, the particular recording time may be varied to meet the design criteria of a particular implementation. For example, a time between 5 and 15 seconds may be appropriate. The SSD firmware 98 keeps a list of all of the LBAs accessed in the first N seconds after a boot up of the drive. The list is saved to the NAND flash media. When a next boot to the OS occurs, the SSD firmware 98 retrieves the list from NAND flash media, and then pre-reads all of the LBAs that are recorded in the list. Most of the LBAs read will be cache hits in subsequent OS boots. If there are cache misses during the OS booting procedure, the new LBAs can be added into the list.

Figure 3:
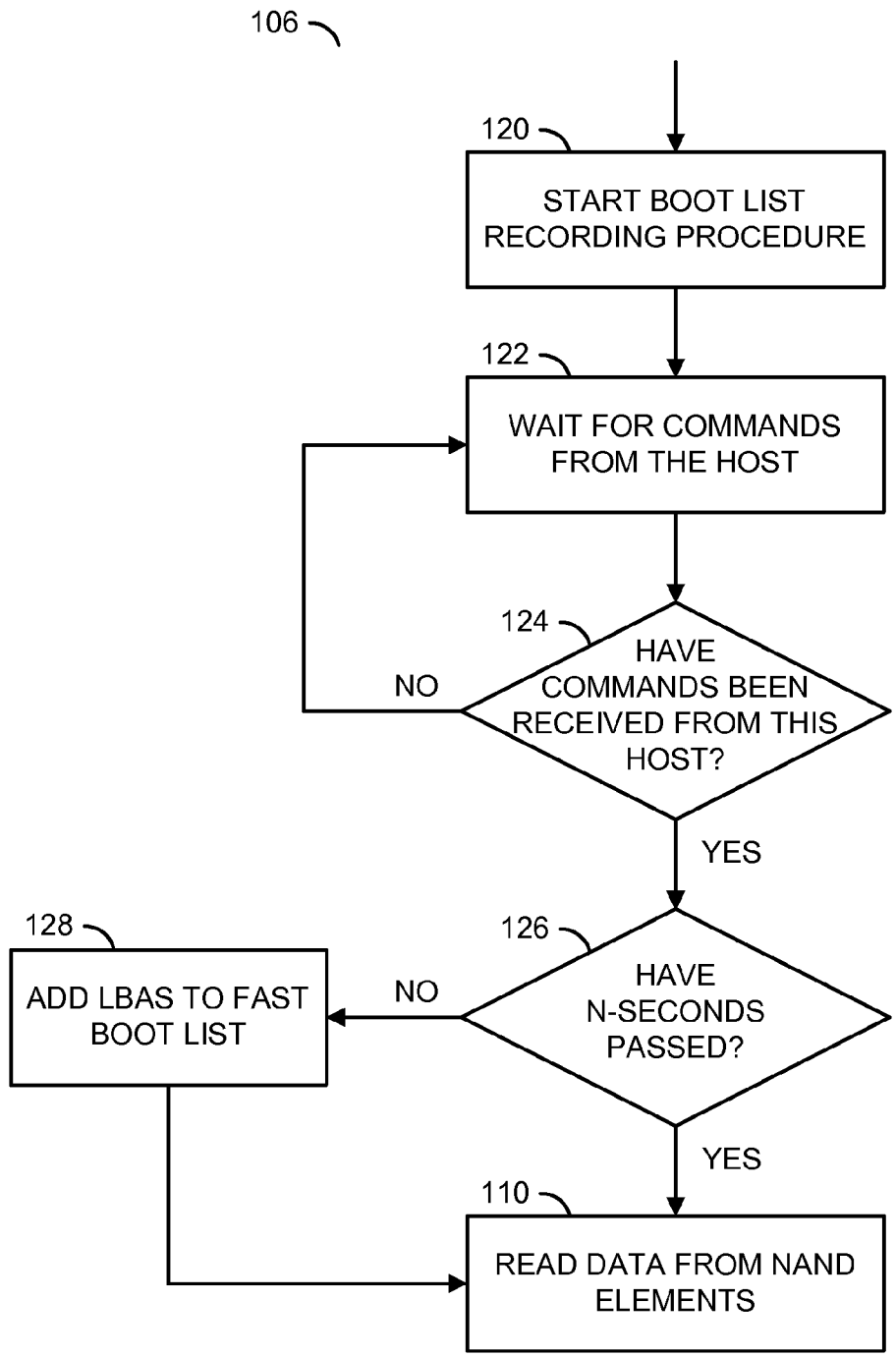
FIG. 3 is a flow diagram of an embodiment of the invention.

Referring to FIG. 3, a more detailed flow diagram of the step (or sub-routine) 106 is shown. The sub-routine 106 generally comprises a step (or state) 120, a step (or state) 122, a decision step (or state) 124, a decision step (or state) 126 and a step (or state) 128 and the state 110. The step 120 starts a boot-list recording procedure. The step 122 waits for commands from the host 82. The decision step 124 determines whether commands have been received from the host 82. If not, the sub-routine 106 returns to the step 122. If so, the sub-routine 106 moves to the decision step 126. The decision step 126 determines whether N seconds have passed. In general, N may be a predetermined amount of time designated as the boot time. If N seconds have passed, the sub-routine 106 moves to the state 110. If not, the sub-routine 106 moves to the state 128. In the step 128, the sub-routine 106 adds one or more logical block addresses to the fast-boot list. Next, the sub-routine 106 moves to the state 110, which reads data from the NAND elements of the flash media 86.

Figure 4:
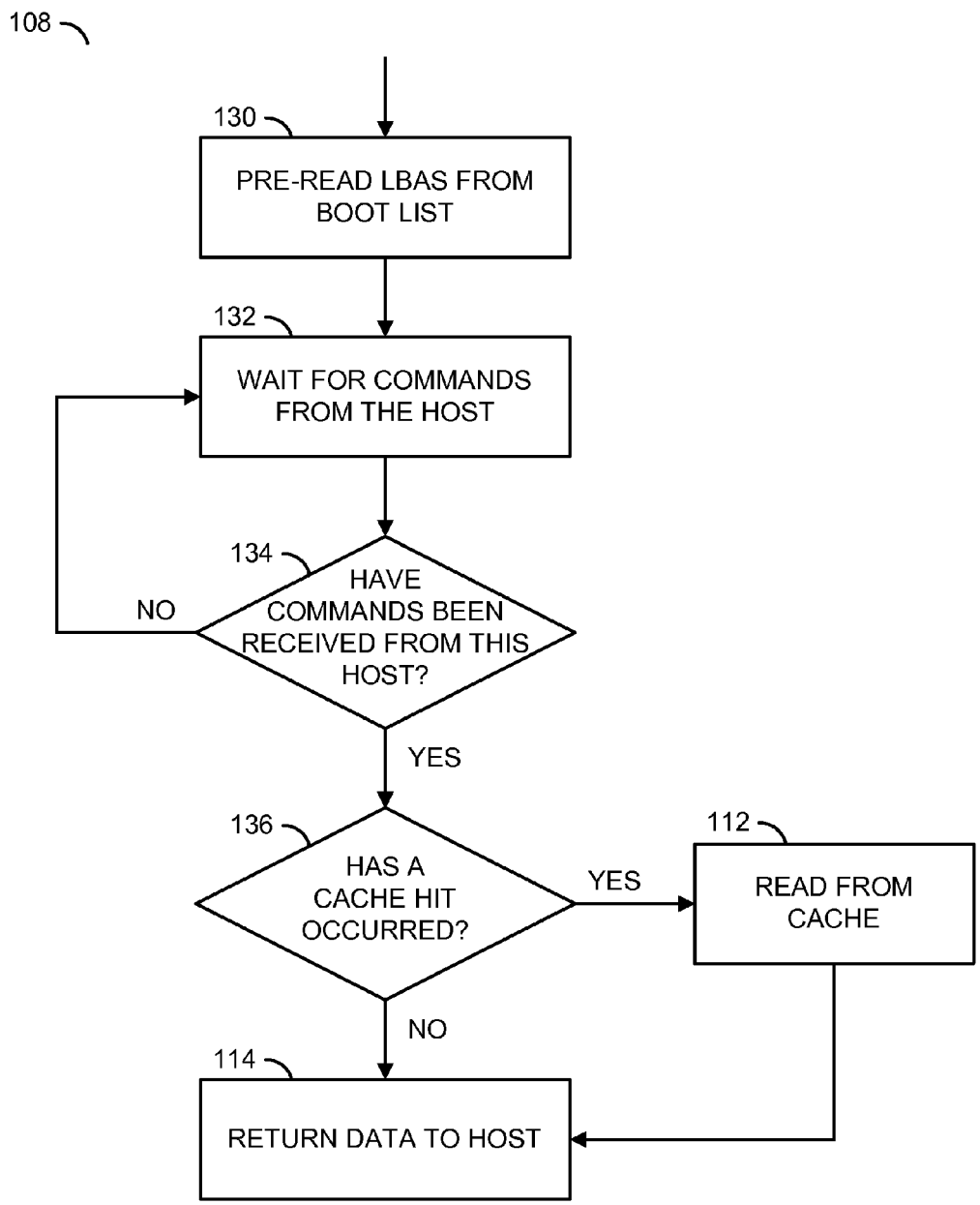
FIG. 4 is a flow diagram of an embodiment of the invention.

Referring to FIG. 4, a flow diagram of the sub-routine 108 is shown. The sub-routine 108 generally comprises a step (or state) 130, a step (or state) 132, a decision step (or state) 134, a decision step (or state) 136, the state 112 and the state 114.

The state 130 may pre-read the LBAs from the boot list. The state 132 may wait for commands from the host 82. The decision state may determine whether commands have been received from the host 82. If not, the sub-routine 108 returns to the step 132. If so, the sub-routine 108 moves to the decision state 136. The decision state 136 determines if a cache hit has occurred. If so, the sub-routine 108 moves to the step 112 and reads from the cache. If not, the sub-routine 108 moves to the step 114, which returns data to the host 82.

Figure 5:
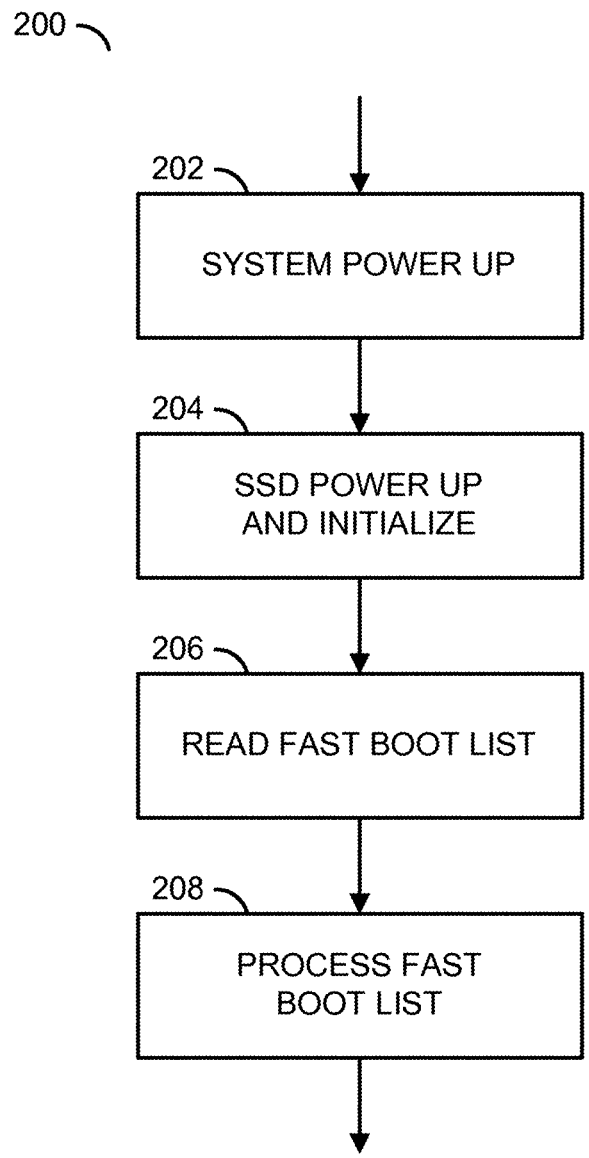
FIG. 5 is a flow diagram of an embodiment of the invention.

Referring to FIG. 5, a flow diagram of a method 200 illustrating an overall operation of the system 80 is shown. The method 200 generally comprises a step (or state) 202, a step (or state) 204, a step (or state) 206 and a step (or state) 208. The step 202 generally comprises a system power up mode. The step 208 generally comprises an SSD power up and initial mode. The step 206 generally comprises a read fast-boot list. The step 208 generally processes the fast boot-list.

Figure 6:
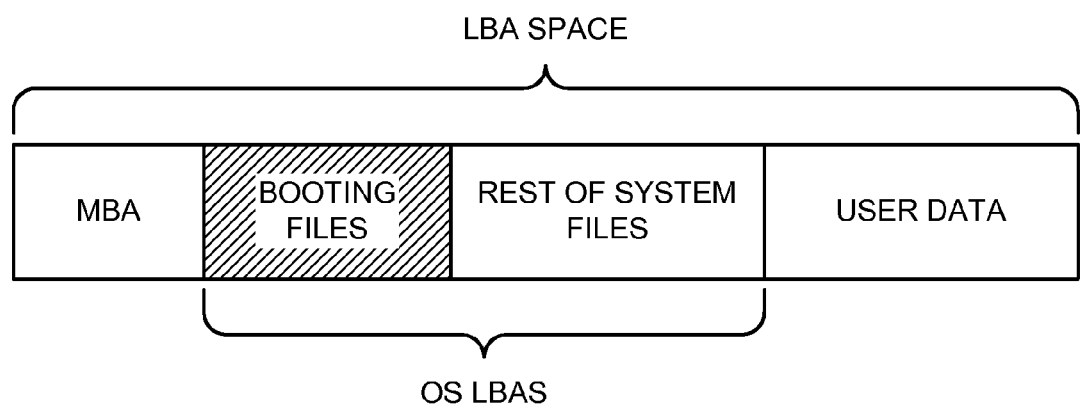
FIG. 6 is a diagram illustrating an organization of the LBAs.

Referring to FIG. 6, a diagram of the organization of the LBA space is shown. In general, the LBA space includes a master boot area (MBA) (or master boot record), a number of booting files, a number of system files, and a number of user data files. The booting files and the system files are generally considered the operating system files, which are shown as a sub-set of the total LBA space. The LBA space may be a graphical representation of the LBA stored in the flash media 86. The MBA may include information relating to a disk partition and/or may include a small program to load the operating system files. The booting files may be read when the OS begins a boot process. The booting files are generally stored in the quick list. The rest of the system files may be used by the operating system, but not necessarily during the boot process. For example, help documents, or other drivers not routinely used may be part of the operating system, but not necessarily needed in the fast-boot list. The particular files stored in the fast-boot list may be varied to meet the design criteria of a particular implementation. For example, if a particular driver is used frequently, but is not necessarily essential for a boot operation, the process described would load such a driver into the fast-boot list.

An overall operation of the system 80, and/or the method 100 may be summarized as follows. The system 80 powers up. The SSD 86 powers up and initializes. The SSD firmware 98 reads the fast-boot list from SSD 86 media. The system checks whether the fast-boot list is empty. If fast-boot list is empty, the SSD will enter a fast-boot list recording state. In this state, the SSD will record the LBAs that the host 82 reads in the first N seconds (e.g., where N is variable, typically 10 seconds). If the fast-boot list is not empty, then the SSD will pre-read all the LBAs from the list to the flash memory 86. The host 82 then waits to send commands. After a read command is received from the host 82, the time the command is received is checked to determine whether the command was received within first N second from a boot. Next, a check whether the data the host 82 wants to read has been preread is performed. If a cache hit occurs, then data is directly returned to the host 82 from the RAM 86. If the time is within the first N seconds, then the LBA is recorded to be read from the fast-boot list. Data is then read from the internal RAM. User data is read from the NAND 86. User data is returned to the host 82.

In a typical commercially available NAND flash memory (e.g., using a 25 nm process), one page is 8 KB, and one block contains 256 pages. The maximum time needed to read a page is 75 us. Transferring 8 KB of data out would need 40 us. Reading one page and transferring data out typically needs approximately 100 us. If a read command decoding and translation of one LBA to a NAND page needs 40 us, then transferring one LBA data from the SSD to the host 87 needs 1 us. A typical OS boot reads files containing in the range of 100,000 LBAs. 90% of LBAs typically result in a cache hit during the fast-boot operation.

Without the method 100, a normal booting time would be around 14 seconds ((100 us+40 us+1 us)*100000 LBAs=14.1 s). With the method 100, a fast-boot time would be in the range of seconds ((100 us+40 us+1 us)*100000 LBAs*10%+ (40 us+1 us)*100000 LBAs*90%=5.1 s). By implementing the method 100, the boot speed for an OS may be improved in the range 63.83%.

While the drive 80 has been described as a solid state drive, one or more embodiments of the invention may be implemented in a hard disk drive (HDD). While the advantages of the quick boot operation may be useful in an HDD, the fast-boot operation may be even more pronounced when implemented with an SSD. However, either implementation may be used.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The functions performed by the diagrams of FIGS. 2-5 may be implemented using one or more of a conventional general purpose processor, digital computer, microprocessor, microcontroller, RISC (reduced instruction set computer) processor, CISC (complex instruction set computer) processor, SIND (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the embodiments thereof, it will be understood by those skilled in the art that various changes in form and details may be made without departing from the scope of the invention.

The invention claimed is:

1. A method for booting to an operating system stored on a solid state drive, comprising the steps of:
   (A) determining prior to a boot sequence if a boot list has one or more entries;
   (B) pre-reading one or more logical block addresses of each of said entries from said boot list, wherein said pre-read one or more logical block addresses comprise a portion of all logical block addresses of an operating system, and wherein each of said entries have been populated according to a pre-set amount of time;
   (C) receiving a command from a host;
   (D) reading said command from a memory internal to said solid state drive if said command is in a cache area of said pre-read one or more logical block addresses; and
   (E) reading said command from a main portion of said solid state drive if said command is not in said cache area and adding said command to said pre-read logical block addresses to the boot list and storing the boot list in a cache memory.

2. The method according to claim 1, wherein if step (A) determines said boot list does not have any entries, performing the steps of:
   determining whether commands have been received from the host;
   determining whether a predetermined amount of time has passed; and
   if the said predetermined time has passed, adding one or more logical block addresses to the boot list.

3. The method according to claim 1, wherein if step (A) determines said boot list has entries, performing the steps of:
   determining which said commands are in said pre-read portion; and
   reading said commands from said pre-read portion.

4. The method according to claim 1, wherein said main portion of said solid state drive and said cache area of said solid state drive are implemented in NAND media.

5. The method according to claim 1, wherein said solid state drive comprises a bootable drive configured to store information in a plurality of NAND/media locations organized as said logical block addresses.

6. The method according to claim 1, wherein said method allows access to said solid state drive from a host computer after said boot sequence has completed.

7. The method according to claim 1, wherein said solid state drive comprises a controller portion and a flash media portion.

8. The method according to claim 7, wherein said controller includes said cache memory configured to store said boot list.

9. The method according to claim 8, wherein said cache memory also includes firmware configured to control said solid state drive.

10. An apparatus comprising:
a controller of a solid state drive configured to send and receive information from a host device; and
a memory area of said solid state drive configured to be accessed by said controller, wherein said controller boots an operating system by (i) determining prior to a boot sequence if a boot list has one or more entries, (ii) pre-reading one or more logical block addresses of each of said entries from said boot list, wherein said pre-read one or more logical block addresses comprise a portion of all logical block addresses of an operating system, and wherein each of said entries have been populated according to a pre-set amount of time, (iii) receiving a command from a host, (iv) reading said command from a memory internal to said solid state drive if said command is in a cache area of said pre-read one or more logical block addresses, and (v) reading said command from a main portion of said solid state drive if said command is not in said cache area.

11. The apparatus according to claim 10, wherein said memory internal to said solid state drive is implemented as part of said controller.

12. The apparatus according to claim 10, wherein said main portion of said solid state drive is implemented as part of a flash media.

13. The method according to claim 1, further comprising:
loading a driver to the boot list which has been previously used, the driver having a function not related to boot operation.

14. The method according to claim 1, wherein each of said entries have been further populated according to a type of logical block address, said type of logical block address including at least one of a boot file logical block address or an operating system file logical block address.

15. The apparatus according to claim 10, wherein each of said entries have been further populated according to a type of logical block address, said type of logical block address including at least one of a boot file logical block address or an operating system file logical block address.

16. The apparatus according to claim 10, wherein said controller further boots an operating system by (vi) adding said command to said pre-read logical block addresses to the boot list and storing the boot list in the cache memory;
and (vii) loading a driver to the boot list which has been previously used, the driver having a function not related to boot operation.

17. A system comprising:
a host computing device;
one or more flash memories; and
a controller communicably coupled to said host computing device and to said one or more flash memories, said controller having one or more programmed instructions, said one or more programmed instructions including firmware;
wherein said firmware is configured to (i) determine prior to a boot sequence if a boot list has one or more entries and (ii) pre-read one or more logical block addresses of each of said entries from said boot list, wherein said pre-read one or more logical block addresses comprise a portion of all logical block addresses of an operating system, and wherein each of said entries have been populated according to a pre-set amount of time; and
wherein said one or more programmed instructions are configured to (i) receive a command from a host, (ii) read said command from a memory internal to said one or more flash memories if said command is in a cache area of said pre-read one or more logical block addresses, and (iii) read said command from a main portion of said one or more flash memories if said command is not in said cache.

18. The system according to claim 17, wherein each of said entries have been further populated according to a type of logical block address.

19. The system according to claim 17, wherein said one or more programmed instructions are further configured to (vi) add said command to said pre-read logical block addresses to the boot list and store the boot list in said memory internal to said one or more flash memories; and (vii) load a driver to the boot list which has been previously used, the driver having a function not related to boot operation.

20. The system according to claim 17, wherein said controller boots according to a fast-boot time of about five seconds.

* * * * *